(12) United States Patent
Kellner

(10) Patent No.: US 7,480,613 B2
(45) Date of Patent: Jan. 20, 2009

(54) METHOD OF SUPPORTING THE PROOF-READING OF SPEECH-RECOGNIZED TEXT WITH A REPLAY SPEED ADAPTED TO THE RECOGNITION RELIABILITY

(75) Inventor: Andreas Kellner, Aachen (DE)

(73) Assignee: Koninklijke Philips Electronics, N.V., Eindhoven (NL)

( * ) Notice: Subject to any disclaimer, the term of this patent is extended or adjusted under 35 U.S.C. 154(b) by 717 days.

(21) Appl. No.: 10/210,835

(22) Filed: Jul. 31, 2002

(65) Prior Publication Data

US 2003/0028375 A1 Feb. 6, 2003

(30) Foreign Application Priority Data

Aug. 4, 2001 (DE) ................................ 101 38 408

(51) Int. Cl.
*G10L 21/04* (2006.01)
*G10L 15/00* (2006.01)
(52) U.S. Cl. ...................... 704/231; 704/211; 704/235; 704/251
(58) Field of Classification Search ................ 704/231, 704/234–235, 251, 211
See application file for complete search history.

(56) References Cited

U.S. PATENT DOCUMENTS

| 5,625,749 | A | * | 4/1997 | Goldenthal et al. ......... 704/254 |
| 5,799,273 | A | * | 8/1998 | Mitchell et al. ............. 704/235 |
| 6,006,183 | A | | 12/1999 | Lai et al. .................... 704/235 |
| 6,490,553 | B2 | * | 12/2002 | Van Thong et al. ......... 704/211 |
| 6,505,153 | B1 | * | 1/2003 | Van Thong et al. ......... 704/211 |
| 6,785,650 | B2 | * | 8/2004 | Basson et al. ............... 704/235 |
| 6,865,258 | B1 | * | 3/2005 | Polcyn .................... 379/88.01 |
| 6,952,673 | B2 | * | 10/2005 | Amir et al. .................. 704/235 |

* cited by examiner

*Primary Examiner*—David R Hudspeth
*Assistant Examiner*—Abdelali Serrou

(57) ABSTRACT

The invention relates to a method of supporting the proof-reading of a text (2, 30) obtained in particular by speech recognition from a speech signal (1), of which at least one text component (B1 to B5) has a reliability level (3) for its correctness, which method comprises a control of the progression of the replay speed (12, 13) of the part of the speech signal (1) belonging to the text component (B1 to B5) as a function of the reliability level (3) of the text component (B1 to B5).

Figure 1:
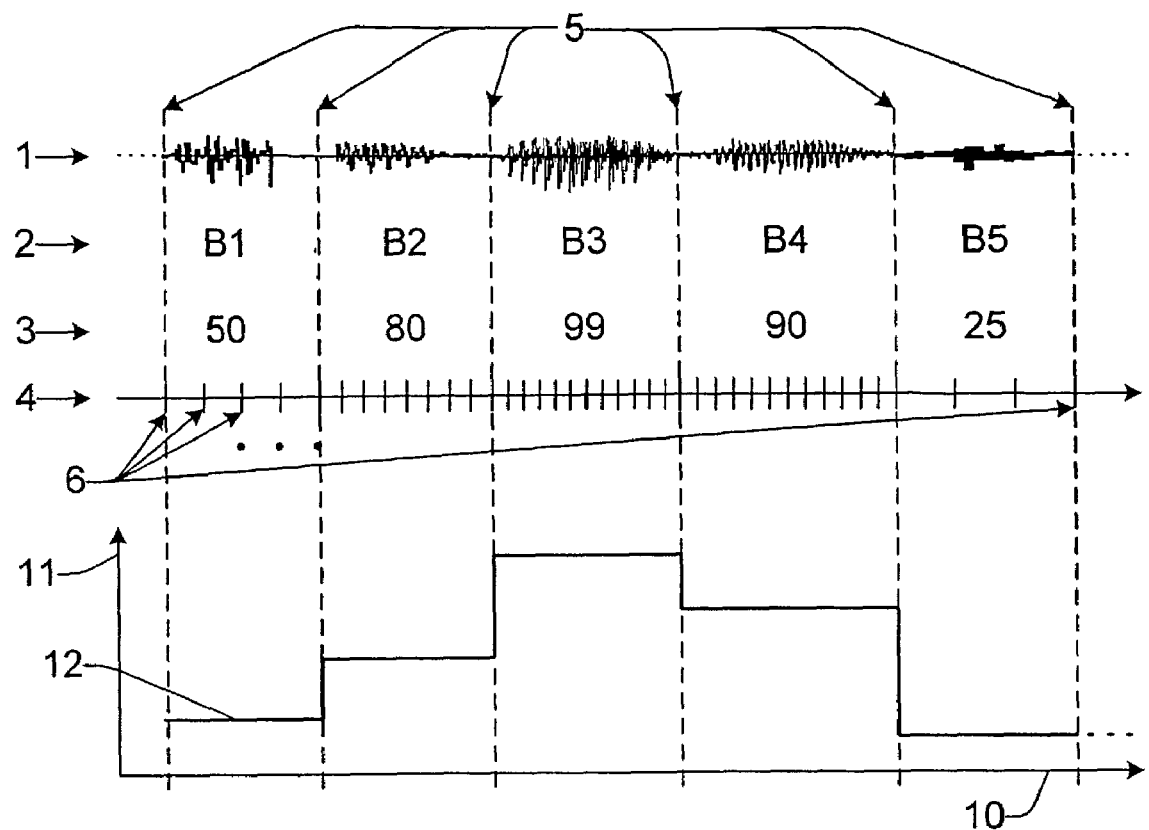

Faster replay of the reliable passages of a speech signal (1) shortens the working time required for proof-reading, while the slow replay of the unreliable passages raises the attention of the proof-reading user. An acoustic and/or visual (32) marking of the passage as a function of its reliability (3) is advantageous. The method according to the invention is particularly suitable for implementation within a speech recognition system.

19 Claims, 2 Drawing Sheets

METHOD OF SUPPORTING THE PROOF-READING OF SPEECH-RECOGNIZED TEXT WITH A REPLAY SPEED ADAPTED TO THE RECOGNITION RELIABILITY

The invention relates in general to the field of speech recognition and in particular the field of proof-reading of speech-recognized text. For some years now various speech recognition systems have been available commercially which allow a user to dictate a text acoustically in order then to have this automatically transcribed to written text by the speech recognition system. However, such speech recognition systems make recognition errors in practice so that the automatically generated text usually contains errors. Therefore, some of these systems, for example the product FreeSpeech from the Philips company, include a correction editor in their supply package which allows manual correction of the speech recognition errors.

To support the manual correction method in FreeSpeech it is possible to view and edit the recognized text and listen to the original dictation at the same time. On replay, the text passages are marked which the speech recognition system has allocated to the dictation passage just played during the speech recognition process. The user who wishes to proof-read the text can stop the acoustic replay of the dictation and continue it again by activating corresponding controls. The continuation point can be selected by scrolling up and down but also by positioning the text cursor in the recognized text, where the correlation between text and acoustic signal established in the speech recognition method is used again. Furthermore, the user can adjust the replay speed of the dictation manually according to his requirements.

In recent years many speech recognition systems, in addition to their pure speech recognition function, have been equipped with the facility for calculating reliability levels. These levels allow a quantitative conclusion on how reliable the recognition result is. Ideally, they represent the probability that the recognition result is correct. Often, however, they give only a relative indication of which parts of the recognition result are more reliable and which are less reliable. Such levels are calculated on different levels, depending on the design. Many systems calculate a reliability level for each sentence, word, syllable or for larger or smaller text elements which in some cases arise only from the special internal structure of the system (for example Hidden Markov Models as sub-word units).

U.S. Pat. No. 6,006,183 discloses a speech recognition system in which the correction editor (user interface for displaying said text) indicates the reliability level of a word by selecting its corresponding display property. The display properties include font type, point size, attributes, effects (bold, italics, flashing etc.), shades of gray (gray scale map), and colors (shades of a single color, color map).

Whereas many of these display properties for example color shading, are quite able to represent even continuously distributed reliability levels, U.S. Pat. No. 6,006,183 states that it is advantageous to combine the possible reliability values into a few sub-ranges by defining suitable threshold comparisons (boundaries of each sub-range). In particular a comparison with a single score threshold may distinguish exclusively between reliable and unreliable recognition results. U.S. Pat. No. 6,006,183 therefore provides that a user of a correction editor can conFig. the display properties individually.

A suitable choice of display properties thus enables a user to see the reliability level of the recognized text in a clear manner. For example, he may show the reliable text in standard color and the unreliable text in red. Obviously, finer stages are also possible, depending on preference. This highlighting of the unreliable text components draws the user's attention to these text passages, and as a result it is easier for him to detect recognition errors which occur more frequently in these passages. In particular, this mechanical support for the manual correction method reduces the time necessary for correcting the speech result.

It is an object of the invention to create a method and a device which support further the method for manual correction of a text obtained from speech recognition of a speech signal and to shorten further the working time required for correction.

This object is achieved firstly by:
   a method of supporting the proof-reading of a text obtained by speech recognition of a speech signal, of which at least one text component has a reliability level for the correctness of its speech recognition, which method includes controlling of the gradient of replay speed of the part of the speech signal belonging to the text component as a function of the reliability level of the text component, and secondly by
   a device for supporting the proof-reading of a text obtained by speech recognition of a speech signal, of which at least one text component has a reliability level for the correctness of its speech recognition, which device is designed to control the gradient of the replay speed of the part of the speech signal belonging to the text component as a function of the reliability level of the text component.

The invention thus proposes the use of a higher replay speed for the passages of a speech signal detected as reliable than for those detected as unreliable. By contrast, the entire speech signal had to be replayed at lower speed previously in order to give the user sufficient time to recognize errors. This shortens the working time required for proof-reading. This applies in particular when the reliable passages of the speech signal predominate, which is normally the case because of the low error rates of current speech recognition systems in typical dictation applications. Furthermore, the lowering of the replay speed of the unreliable passages heightens the user's attention when proof-reading these passages and gives him more time to recognize the recognition errors which occur frequently in these passages. This supports the proof-reading method.

The advantageous embodiments of the invention claimed in claims 2 to 6 may also be combined.

In a simple embodiment, the invention may, for example, be implemented such that the part of the speech signal belonging to a component of the recognized text, i.e. a word, a sentence, a syllable, or some other unit, can be replayed at a constant speed depending on the reliability level of the component. The sudden change in replay speed between parts of the speech signal temporally adjacent but of different reliability may, however, cause irritation in a user of the method. Therefore, it is claimed in claim 2 to carry out an adjustment of the replay speed of temporally adjacent parts of the speech signal. In total this gives a smooth temporal development of the replay speed of the speech signal without sudden or steep changes, which allows the user to follow the speech signal without irritation.

Such an adjustment of the replay speed of temporally adjacent parts of the speech signal may, for example, lead to certain changes in replay speed being suppressed. Thus, for example, the situation may occur in which a relatively short reliable passage lies temporally between two unreliable passages of the speech signal. In order not to confuse the proofreading user in such a situation, it may be sensible to replay all three passages with a uniform speed corresponding to the reliability level of the unreliable text components.

As is known, a simple change in replay speed of a speech signal modifies the pitch, i.e. the gradient of the pitch of the signal: rapid replay gives a Mickey Mouse voice, slower replay a growling voice. Such a shift in voice pitch unnecessarily distracts the user. In claim 3, therefore, the invention is advantageously structured such that a change in replay speed takes place in such a manner that the pitch of the speech signal is not affected. Methods for such speed changes are known to the expert, for example, from the literature.

In principle, the choice of a replay speed of the speech signal can be made dependent in a constant manner on the reliability level of the associated part of the recognized text. It may be simpler for the user of the method, however, if he is confronted with only a few replay speeds. This makes it easier for him to distinguish between the reliable and unreliable parts of the speech recognition result. This can be achieved according to claim 4 in that the total range of all possible values of the reliability is divided into individual sub-ranges, i.e. for example a possible total range from 0 to 100 (percentage reliability) into 10 sub-ranges 0 to 10, 10 to 20, etc., up to 90 to 100, and the replay speed is then selected as a function of the sub-range to which the reliability value of the associated part of the recognized text belongs.

According to claim 5, the reliability level of a component may be marked in an acoustic and/or visual manner. For example, unreliable passages can be replayed louder, with a changed voice pitch, and/or with greater emphasis. In addition, they may be marked in color, for example in red.

Claim 6 proposes that a user of the system has the possibility of configuring the method of replay according to his own wishes and requirements. Thus he may, for example, adjust the replay speed changes, volume and color marking to his own preferences. For visual marking of the reliability level and the configuration options of a user, all possibilities disclosed in U.S. Pat. No. 6,006,183 may be considered in particular, for which reason U.S. Pat. No. 6,006,183 is to be regarded as included in the present application in this respect.

Claim 8 of the invention relates to a speech recognition system which has as a component a device according to the invention to support proof-reading of a text obtained by speech recognition of a speech signal. Integration of the device for supporting proof-reading of a text obtained by speech recognition of a speech signal into the speech recognition system brings the user the advantage that he has a complete dictation system in one package. As a result, possible interface problems are avoided between a text obtained by speech recognition of a speech signal and the associated reliability level on the one side, and a device according to the invention to support proof-reading of the text on the other.

Claims 9 and 10 relate to embodiments of the invention in which the text to be proof-read is not necessarily obtained by speech recognition. The invention may, for example, be used to support proof-reading of a text produced manually or obtained by manual correction of a speech-recognized text. If the allocation between components of the text and the associated parts of the speech signal is known and reliability levels can be assigned to the text components, the changes in replay speed of the text during proof-reading can be structured according to the concept of the invention.

Such reliability levels may arise, for example, from error statistics of the text writer. Thus, for, example statistics from previous corrections by the writer may be produced in order to quantify, for, example which words the writer often writes incorrectly. Many writers have a tendency, for example, to make ending errors in grammatical deflections. Alternatively, the number of letters of an element may be compared with the duration of the associated part of the speech signal in order to conclude omissions or insertions of elements in the case of major deviations of the ratio from the average obtained in dictation.

Claim 10 claims an embodiment of the invention in which the allocation of text components to the associated parts of the speech signal is determined by a time alignment of the text with the speech signal. Such a time alignment may take place, for example, by the methods of dynamic programming (dynamic time warping) and in particular using the Viterbi algorithm (Viterbi alignment). The relevant reliability levels of the components may be determined either, for example, by correction statistics as explained above or other methods of speech recognition may be used for determination. The inclusion of background models (garbage models) or competing recognition alternatives in the speech recognition of the speech signal are known in this context.

Figure 2:
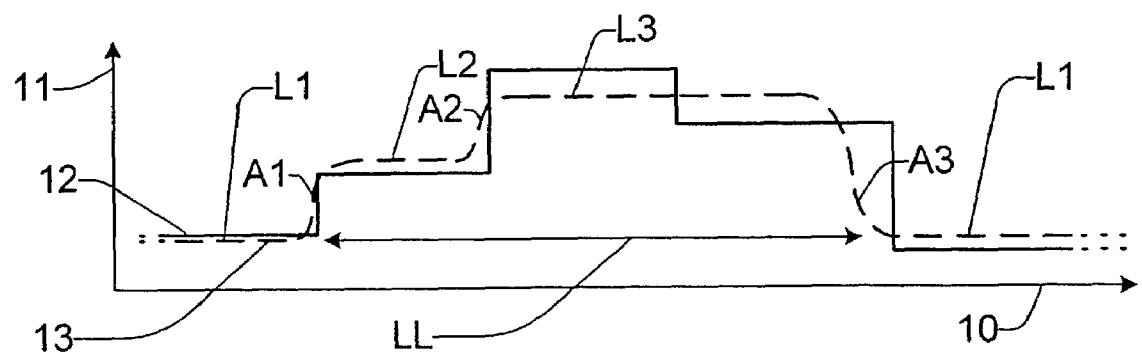
Figure 3:
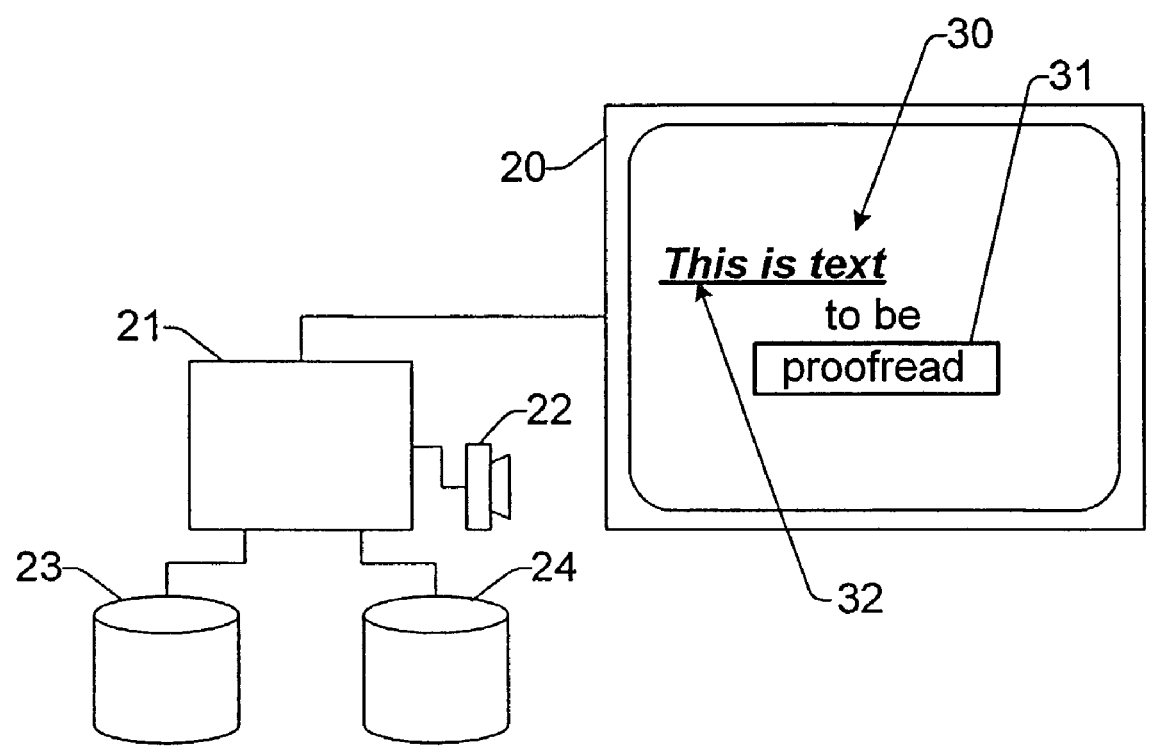

These and further aspects and advantages of the invention will now be described in more detail with reference to embodiments and in particular to the drawings, in which:

FIG. 1 shows a speech signal with its components, reliability levels, and a depiction of the replay speed changes, FIG. 2 depicts a further possibility for structuring the replay speed changes, and FIG. 3 shows an embodiment of a device according to the invention for supporting text proof-reading.

FIG. 1 shows a speech signal with its components, reliability levels and the replay speed changes. Line 1 of FIG. 1 first shows a speech signal with time plotted horizontally towards the right and a physical parameter of the speech signal, for example the acoustic pressure in the receiving microphone, is plotted vertically upwards. This depiction already takes into account the unequal gradient according to the invention of the development of the replay speed during proof-reading. In time ranges in which the speech signal is replayed slowly, the speech signal is shown correspondingly stretched, and in areas in which it is replayed quickly, it is shown comparatively compressed. The text components belonging to the speech signal are shown in line 2 of FIG. 1 and marked B1 to B5. These components may be words, syllables, phonemes, coherently spoken phrases, or other units. The association of components B1 to B5 in line 2 with the parts of the speech signal in line 1 is made clear in that the components B1 to B5 stand centrally below the associated parts of the speech signal. The time limits between the components are indicated in FIG. 1 by the vertical lines 5.

Line 3 of FIG. 1 shows the relevant reliability levels of components B1 to B5. For illustration, concrete numerals 50, 80, 99, 90 and 25 are selected on a scale of 0 to 100 (100% reliability), where the higher numerals denote higher reliability levels. Line 4 shows a time axis with time increasing to the right. This time axis is divided by the vertical markings 6, the different intervals of which indicate the corresponding stretching or compression of a time axis divided evenly and hence the different replay speeds of the speech signal during proof-reading.

The development of the replay speed used for proof-reading of the speech signal is shown for further explanation in an x-y view in the lower part of FIG. 1 again. The right-hand axis 10 again corresponds to the time axis at the same (stretched or compressed) levels as in the other parts of FIG. 1; the vertical axis 11 gives the replay speed in units not specified further. The time gradient of the replay speed itself is given by line 12. The dotted lines at the left and right-hand edges of line 1 and line 12 indicate that the speech signal shown in FIG. 1 may be just a section of a longer signal.

The embodiment of the inventive method shown in FIG. 1 is a variant which selects a different replay speed for all reliability values, the speed increasing with the reliability. The speed remains constant within an area of uniform reliability, but between areas of different reliability the speed changes suddenly.

As was noted above, sudden changes in replay speed may confuse the proofreading user, so FIG. 2 shows a further possibility for structuring the gradient of the replay speed. Again the temporal speed development is shown in an x-y diagram with a time axis 10 and a speed axis 11. For better comparison with the embodiment of the invention shown in FIG. 1, FIG. 2 again shows the sudden changes in speed 12 as in FIG. 1. The speed path 13 in FIG. 2 may be selected as an alternative to this path 12 for the speech signal in FIG. 1.

In contrast to the path 12, the path 13 has only three speed levels L1 to L3. The five reliability values B1 to B5 from FIG. 1 are therefore combined into three sub-ranges of all possible reliability values and one of the three speed levels L1 to L3 is selected for the replay speed of the corresponding part B1 to B5 in accordance with its allocation to one of these sub-ranges. In concrete terms in FIG. 2, sub-ranges 0 to 60, 60 to 85 and 85 to 100 are selected. This gives the following allocations of speed levels L1 to L3 to reliability values of the five components B1 to B5 from FIG. 1: 25 for B5 and 50 for B1 at level L1, 80 for B2 at level L2, and 90 for B4 and 99 for B3 at level L3. The same speed level L1 is selected, as is shown by the allocation line LL in FIG. 2, in particular with 25 for B5 and 50 for B1.

Furthermore, an adjustment is made of the replay speeds of temporally adjacent parts of the speech signal in structuring the speed path 13. For this the replay speeds of parts B1 to B5 are maintained at the allocated speed levels L1 to L3 in their inner ranges only, whereas at the edges the replay speed is changed so as to give a smooth transition A1 to A3 between the speed levels on the inside. Individually from left to right the following speed adjustments take place: A1 between B1 and B2 from L1 to L2, A2 between B2 and B3 from L2 to L3, and A3 between B4 and B5 from L3 to L1. As the reliabilities 99 and 90 of B3 and B4 belong to the same reliability sub-range, there is no speed adjustment between B3 and B4, but the allocated speed level L3 is maintained even in the boundary area.

FIG. 2 shows two possibilities for the temporal position of the speed adjustments A1 to A3. The two adjustments A1 and A2 are arranged symmetrically about the relevant time boundaries between the speech signal passages. This means, for example, for adjustment A1 that the replay speed begins to rise from speed level L1 just before the end of the passage belonging to B1 and only reaches the associated speed level L2 after the start of the passage belonging to B2. In adjustment A3, however, the entire adjustment is completed in the passage belonging to the more reliable part B4, so that the passage belonging to the less reliable part B5 is fully replayed at the slower speed L1 already. This has the advantage that the less reliable passage is replayed in full at the correspondingly slower speed (or even slower if an even less reliable passage is adjacent) and thus the user is given sufficient time for proof-reading.

In a further adjustment of the replay speed gradients for the components B1 to B5, the component B2 may be replayed at the same speed level L1 as component B1. The speed level L2 would then no longer appear in FIG. 2. The reason for this is that the duration of the passage of the speech signal belonging to the component B2 is relatively short. The brief change in replay speed to the speed level 2 for the component B2 shown in FIG. 2 could be perceived as rather confusing by the proof-reading user. Therefore the user could select a greater adjustment of the speed changes of temporally adjacent passages, whereby the speed adjustment A1 between B1 and B2 from L1 to L2 is suppressed and the speed adjustment A2 between B2 and B3 at the transition from L1 to L3 is modified.

FIG. 3 shows an embodiment of the device according to the invention for supporting proof-reading of a text. The text to be proof-read is shown in full on the display 20, or only the extract surrounding the part that is being replayed acoustically. For example, FIG. 3 shows the text 30 with the wording "Dies ist Korrektur zu lesender Text" ("This is text to be proof-read"). It is assumed that part of the speech signal has just been replayed which belongs to the text element, here a word, "Korrektor". This replay item is marked in the text 30 shown on the display 10 by a frame 31 around the item being replayed.

The two text items 32, namely the phrase "Dies ist" ("this is") and the word "Text" ("text") are highlighted by means of a special text attribute, namely bold italics with underlining. In this example it is assumed that only two reliability sub-ranges, namely "reliable" and "unreliable" are distinguished. Reliable passages are shown in normal print, unreliable ones highlighted as described. From the replay speed the text begins slowly with the unreliable part "Dies ist" ("this is"). The reliable middle part "Korrektor zu lesender" ("to be proof-read") is played quickly, and the replay of the sentence ends with the slowly replayed unreliable part "Text" ("text").

The display 20 is controlled by the control unit 21 which also controls the speaker 22 via which the speech signal is replayed. The control unit 21 takes the speech signal from the speech signal memory 23 and the recognized text, the allocation information of its components to the associated parts of the speech signal, and the reliability level of the components from the text memory 24.

The invention claimed is:

1. A computer-implemented method for supporting proof-reading of a text obtained by speech recognition of a speech signal, said method comprising:
   dividing said text into components having respective reliability levels for correctness of their speech recognition, wherein a rate of speech replay of each of said components is based on the associated reliability level; and,
   in said proof-reading continuously throughout said text, controlling progression of replay speed of the speech signal as a function of the respective reliability levels of the text components, wherein the replay speed is adjusted based on the rate of speech replay of temporally adjacent components to allow a smooth transition from one component replay speed to another component replay speed.

2. A method of supporting the proof-reading of a text obtained by speech recognition of a speech signal, of which at least one text component has a reliability level for the correctness of its speech recognition, wherein the method comprises the steps of:
   control of the progression of the replay speed of the part of the speech signal belonging to the text component as a function of the reliability level of the text component, wherein the progressions of the replay speeds of temporally adjacent parts of the speech signal are adjusted to each other to allow a smooth transition from one component replay speed to another component replay speed.

3. A method as claimed in claim 2, wherein the progression of the replay speed of the part of the speech signal is controlled without changing the gradient of the pitch of the part of the speech signal.

4. A method as claimed in claim 1, wherein a value range of the reliability levels is divided into sub-ranges, and in that the progression of the replay speed is controlled as a function of the sub-range to which the reliability level of the text component is allocated.

5. A method as claimed in claim 2, wherein the reliability level of the text component is marked acoustically and/or visually.

6. A method as claimed in claim 2, further comprising:
providing a user of the method with the capability to configure the dependency between the progression of the replay speed and the reliability level of the text component and/or the degree of adjustment of the progressions of the replay speeds of temporally adjacent parts of the speech signal and/or the sub-ranges of the reliability levels and/or the method of acoustic and/or visual marking of the reliability level of the text component.

7. A device for supporting the proof-reading of a text obtained by speech recognition of a speech signal, of which at least one text component has a reliability level for the correctness of its speech recognition, wherein the device is designed to control the progression of the replay speed of the part of the speech signal (1) belonging to the text component as a function of the reliability level of the text component, wherein the progressions of the replay speeds of temporally adjacent parts of the speech signal are adjusted to each other to allow a smooth transition from one component replay speed to another component replay speed.

8. A speech recognition system with a device for supporting proof-reading that is continuous throughout a text obtained by speech recognition of a speech signal, said text being divided into text components having respective reliability levels for the correctness of their speech recognition, wherein the device is designed to control, during the continuous proof-reading, progression of replay speed of the speech signal as a function of the reliability level of the text component adjusted to allow a smooth transition from one component replay speed to another component replay speed.

9. A computer-implemented method of supporting proof-reading that is continuous throughout a text obtained by transcription into written form of a speech signal and divided into respective text components having respective reliability levels for their correctness, respective parts of the speech signal belonging to the text components being known, wherein said method includes:
deriving the reliability levels; and
controlling, during the continuous proof-reading, progression of replay speed of the speech signal as a function of the reliability levels of the respective text components to allow a smooth transition from one component replay speed to another component replay speed.

10. A computer-implemented method for supporting proof-reading of a text obtained by transcription into written form of a speech signal, comprising:
determining, throughout said text, which part of the speech signal belongs to which component of said text by time warping the text to the speech signal;
determining a reliability level for correctness of the text component, controlling progression of replay speed of the part of the speech signal belonging to the text component as a function of the reliability level of the text component; and
adjusting said replay rate to allow a smooth transition from one component replay speed to another component replay speed.

11. The method of claim 10, wherein said reliability level is a variable having more than two values within a domain of said function.

12. The method of claim 11, wherein said progression involves respective replay speeds for said more than two values.

13. The method of claim 1, wherein at least three of said reliability levels mutually differ.

14. The device of claim 7, wherein at least three reliability levels of respective text components mutually differ.

15. The device of claim 1, wherein said progression involves respective replay speeds for said at least three reliability levels.

16. The system of claim 8, wherein at least three of said reliability levels mutually differ.

17. The system of claim 16, wherein said progression involves respective, different replay speeds for said reliability levels.

18. The method of claim 9, wherein said transcription is manual or obtained by manual correction of speech-recognized text.

19. The method of claim 9, wherein said text being proof-read was written by a writer, said deriving comprises producing error statistics from previous corrections by the writer.

* * * * *